UNITED STATES PATENT OFFICE.

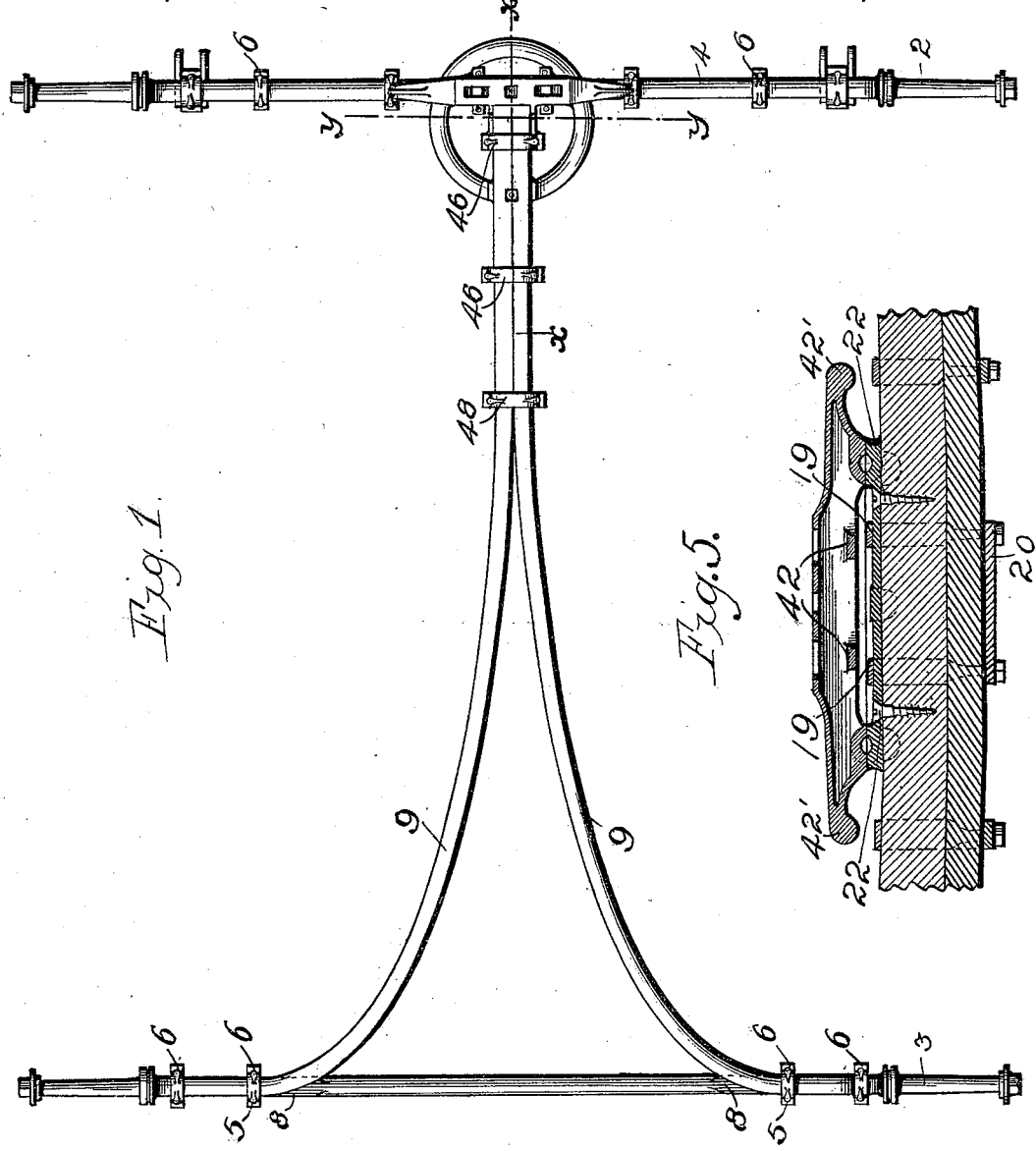

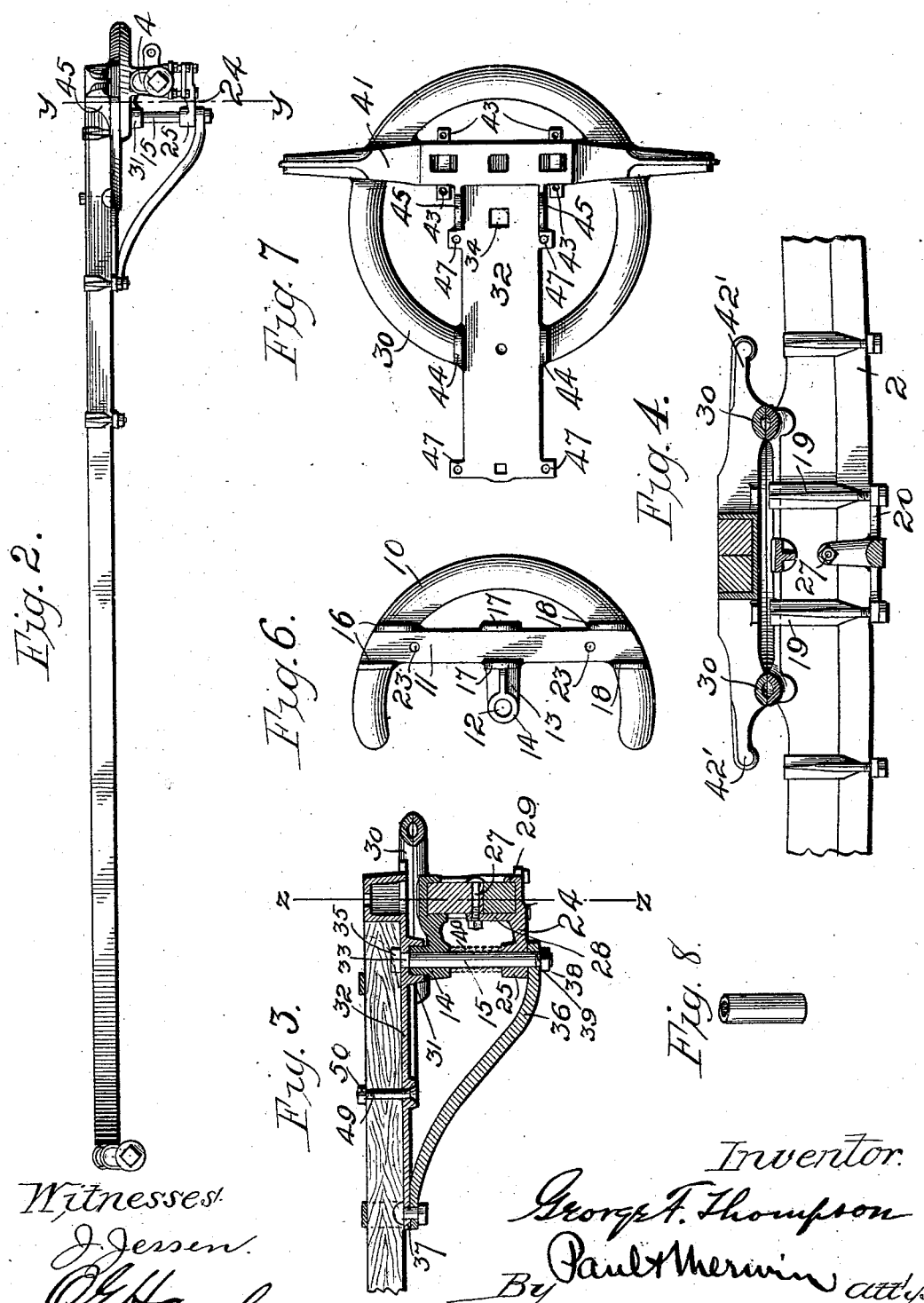

GEORGE F. THOMPSON, OF MINNEAPOLIS, MINNESOTA.

VEHICLE-GEARING.

SPECIFICATION forming part of Letters Patent No. 514,892, dated February 13, 1894.

Application filed November 7, 1891. Serial No. 411,144. (No model.)

*To all whom it may concern:*

Be it known that I, GEORGE F. THOMPSON, of Minneapolis, in the county of Hennepin and State of Minnesota, have invented certain Improvements in Vehicle-Gearing, (Case No. 2,) of which the following is a specification.

My invention relates to an improved fifth wheel and gearing for vehicles and especially to a neat, compact and durable construction for such parts of the vehicle.

The object of the invention is to provide a light cheap gear of a very simple construction which may be easily applied and in which the king bolt will be concealed and at the same time serve to firmly connect the parts.

To this end my invention consists in the combination with the forward axle of a metal lower segment of the fifth wheel, having a central and backwardly extending part integral therewith and wherein the king bolt is journaled, said lower parts arranged to be secured upon the axle and having lugs to engage the front and rear sides thereof, a backwardly extending metal fixture arranged on the lower side of the axle and wherein the lower end of the king bolt is journaled, the reach and an upper section of the fifth wheel which is coincident with the lower part and provided with a backwardly extending plate wherein the end of the reach is secured, the head of the king bolt being immovably secured in its upper part, and means being provided for pivotally bracing the axle and reach; in a particular integral construction for various parts ordinarily made separate and of different material; and in various details of construction and in combinations all as hereinafter described and particularly pointed out in the claims.

My invention will be more readily understood by reference to the accompanying drawings, in which—

Figure 1 is a plan view showing the two axles, the reach, and the gearing of a vehicle which embodies my invention. Fig. 2 is a side view of the same. Fig. 3 is an enlarged vertical longitudinal section on the line *x—x* of Fig. 1. Fig. 4 is a similarly enlarged section on the line *y—y* of Figs. 1 and 2, the section being taken between the king bolt and the axle. Fig. 5 is a transverse section on the line *z—z* of Fig. 3. Fig. 6 is a plan view from below of the lower section of the fifth wheel. Fig. 7 is a plan view from above of the upper section of the fifth wheel, showing the reach plate and the spring rest for head, both of which are cast in the same piece with the ring or circle. Fig. 8 is a detail.

As shown in the drawings, 2 and 3 represent the forward and rear axles respectively and 4 the axle stock arranged on the top of the axle 2 and secured thereon by the clips 6 having their under ends fastened in plates beneath the axle.

My reach is formed of the two parts 9 which from their rear ends bend in toward the middle of the vehicle and meet near their forward ends being secured as shown to form substantially one solid reach end to be fastened on the fifth wheel. The curved ends are bent into line with the rear axle and being secured on the flat parts 8 of the axle by the clips 5 serve as the axle stock wherein the body springs are bolted. Thus each part of the reach serves as such and also as a brace and as part of the axle stock.

The lower section of the gearing or fifth wheel is cast in a single piece and consists of the semicircular rim 10 having the neat curved form shown and a flat upper side whereon the upper part of the gear rests. The cross bar 11 is integral with the rim and extends across between the center 12 of the ring and the circumference thereof. The rearwardly extending portion or lug 13 is arranged on the bar 11 and has the vertical sleeve 14 adapted to receive the king bolt 15 as shown clearly in the sectional view 3. This cross portion and the rim 10 are provided with the several sets of lugs like those numbered 16, 17 and 18. These are to extend down on each side of the axle stock 4 to prevent any movement of the lower section of the gearing independently of the axle stock. These parts are further secured by the clips 19 passing over the same and having their ends secured in the plate 20 provided beneath the axle 2 as shown most clearly in Figs. 4 and 5. The screws 22 extending through the openings 23 provided in the part 11 also strengthen the connection between said parts. The plate 20 serving as the clamping plate of the clips 19 is provided with the rearwardly projecting lug 24 which has the short sleeve or eye 25 in which the lower part of the king bolt is journaled and held in line with the upper part. This plate is secured independently of the clips by means of the bolt 27 or a screw taking the place thereof and extending into the axle through the upper end of the long lug 28 projecting up from the inner side of the plate. This fixture also has the lugs or flanges 29 to engage the forward side of the axle. The upper section having the complete circular rim or ring or circle 30 rests upon the lower part and is held concentric therewith by the depending collar 31 provided on the under side of the reach or perch plate 32 and adapted to fit snugly over the rounded upper ends of the sleeve 14. The king bolt has a square shank 33 secured in the square hole 34 in the plate 32. The head 35 of the bolt is recessed into the reach and concealed thereby. The king bolt thus held stationary with respect to the reach has its lower end secured by the forward end of the brace 36 and the nut 38. The upper end of the brace 36 is firmly bolted, screwed or riveted to the rear end 37 of the reach plate 32 as shown. The nut 38 holds the brace and the lower sections of the gearing permanently in position. I ordinarily prevent cramping or binding of the sleeves 14 and 25 upon the king bolt by a short section of pipe 40 shown in Figs. 3 and 8 and placed between the ends of the sleeves and the king bolt, thereby holding the sleeves apart in the proper positions.

Integral with the ring 30 and the reach plate 32 I provide the head block or spring rest 41 having the ornamental curved ends 42. This block is cast hollow, the bottom of the same being open but strengthened by the ribs 42, the ends of which are extended and provided with the holes 43 in which the lower ends of the clips used for fastening the spring upon the top of the block are adapted to be secured. The rear part of the fifth wheel is similarly braced by the reach plate which starts from the rear side of the block 41 and extends back beyond the rear side of the ring forming a firm seat whereon to secure the forward end of the reach. The head and the reach are flush on top. The plate 32 is just wide enough to accommodate the forward end of the reach which is secured thereon between the lugs 44 and the bracket lugs 45 adapted to strengthen the connection between the head and the plate and formed integrally with the same. Clips 46 pass over the top of the reach and have their ends secured in the lateral lugs 47 extending from the side of the reach a short distance back of the reach plate to clamp the two parts of the reach firmly together as shown. The bolt 49 having its head secured beneath the reach plate 32 and is secured by the nut 50 turned down tightly upon the top of the same. The bolts 27 and 49 may be replaced by wood screws, if desired when it will be seen that a gearing is provided in which there are no bolts to get loose; in which the king bolt is completely concealed and protected; and which as a whole is made up of very few parts; the constructions of which parts are extremely simple. Further each part being secured entirely independent of all the other parts repairs or renewals may be more readily made than heretofore. The parts of the gearing are made of metal and usually of malleable iron or may be made of steel as desired and rendered necessary by the use to which they are to be put.

Another and the most important advantage of my device is that the reach and fifth wheel are secured together and also the reach and rear axle without mortises and tenons thereby saving much in the cost of the vehicle.

Having thus described my invention, I claim as new and desire to secure by Letters Patent—

1. The combination of a lower metal section having a rearwardly projecting lug provided with a sleeve to engage a king bolt, said lower part provided with lugs to embrace the axle, a plate arranged on the lower part of the axle and having a sleeved projection to engage the lower part of the king bolt, said plate provided with lugs to engage the axle, one of said lugs adapted to receive a bolt or screw 27 inserted therethrough into the same, and the upper part of the gearing having upon its top the integral reach plate 32, and the integral head block, the reach abutting against said head block and secured upon said reach plate, the king bolt passing through said reach plate and concealed by the forward end of the reach substantially as described.

2. The combination with the axle, of the lower part of the gearing secured upon the top thereof and having an integral cross bar 11, provided with the depending lugs engaging the sides of the axle, a central sleeved lug projecting back from the bar 11 and back of the axle, a plate secured on the bottom of the axle and provided with a sleeved lug concentric with that of the bar 11, said plate provided with a lug 28 extending up the back of the axle and secured thereto by a bolt or screw 27, the upper part of the gearing having upon its top the integral reach plate and the cross or head block, the king bolt passing down through said reach plate back of the axle and through said sleeved lugs, and a reach secured on said plate, abutting against said integral head block and covering the head of said king bolt, substantially as described.

3. The combination with the axle of the reach with the lower section of gearing composed of the integral rim 10, cross bar 11 and sleeved lug 13 and having the depending lugs 16, 17 and 18 to engage the front and back of the axle, the upper section composed of the ring or circle 30 arranged to bear on the rim 10, the head and the reach plate 32, and provided with lugs 44 and 45 to engage the sides of the reach, the king bolt having its upper end secured in the reach plate and means for securing said reach on said plate, means for fastening said lower section, and the lower end of the king bolt, and a brace rod extending from said lower end fastening on the reach, substantially as described.

4. The combination with the axle of the lower section of the gearing adapted to be secured upon the top of the axle, clips for thus securing it, a lug plate arranged beneath the axle and wherein the ends of the clips are secured, sleeves 14 and 25 arranged on said parts, respectively, the upper part of the gearing made up of the ring 30, the hollow head block 41 the reach plate 32, provided with the polygonal opening 34, the king bolt secured therein and extending down through said sleeves, the brace rod 36 secured on the lower end of the king bolt and to the rear end of the reach plate and a reach secured on said plate by clips having their ends fastened by lateral lugs provided on said plate, substantially as described.

5. The combination with the axle, of the lower part of the fifth wheel secured thereon, and provided with the sleeve 14 back of the axle, a plate secured on the bottom of the axle, and having a similar sleeve 25, the upper part of the fifth wheel composed of the ring and the integral reach plate arranged on the top of said ring, and having the depending sleeve or socket 31 to accommodate the upper end of the sleeve 14, the king bolt passing through said plate and through said sleeves, the head of said bolt resting upon the top of said plate, the brace rod 36 secured on the lower end of said king bolt and having its rear end secured on the under side of the reach plate, and the reach fastened upon said plate and covering the king bolt and the bolt which fastens said brace, substantially as described.

6. The combination, with the forward and rear axles, of the fifth wheel, having the reach plate and the reach consisting of the wooden parts, the forward ends of which are fastened closely together on said reach plate and the rear ends of which are bent outwardly and finally into line with the axle and there secured upon the axle and forming the axle stock thereon, substantially as described.

7. The combination, with the forward and rear axles, of the fifth wheel upon the former and having a reach plate 32, the reach composed of the two wooden parts 9—9, the forward ends of which are held together upon said plate, means for further binding the same together, back, of the reach plate, the rear end of the pieces 9 being bent outwardly and finally ending in straight parts extending along the rear axle and secured thereon, said straight rear parts of the reach forming the rear axle stock, substantially as described.

In testimony whereof I have hereunto set my hand this 28th day of October, 1891.

GEORGE F. THOMPSON.

In presence of
  C. G. HAWLEY,
  F. S. LYON.